350-96.3

E197A XR 3,801,391

3-96.30

United States Pat

Dyment et al.

3,801,391

[45] Apr. 2, 1974

[54] METHOD FOR SELECTIVELY ETCHING $Al_xGa_{1-x}As$ MULTIPLIER STRUCTURES

[75] Inventors: John Cameron Dyment, Chatham; Ralph Andre Logan, Morristown; Bertram Schwartz, Westfield, all of N.J.

[73] Assignee: Bell Telephone Laboratories, Incorporated, Murray Hill, N.J.

[22] Filed: Sept. 25, 1972

[21] Appl. No.: 291,941

[52] U.S. Cl. ....................... 156/16, 156/17, 317/235
[51] Int. Cl. ....................... C23f 1/02
[58] Field of Search ........... 156/3, 7, 16, 17, 18, 22; 317/235 AA, 235 AF, 235 AJ, 235 AK, 235 AM, 235 AO, 234 S, 234 V

[56] References Cited

UNITED STATES PATENTS 3,293,092 12/1966 Gunn ................................. 156/17
3,730,799 5/1973 Scannell ................................. 156/5

*Primary Examiner*—William A. Powell
*Assistant Examiner*—Brian J. Leitten
*Attorney, Agent, or Firm*—L. H. Birnbaum

[57] ABSTRACT

A method for selectively etching a layer of $Al_xGa_{1-x}As$ with a low concentration of Al in a multilayer structure while leaving adjacent layers of $Al_xGa_{1-x}As$ material of higher concentration Al relatively unaffected. The structure is immersed in an etchant consisting essentially of an $H_2O_2$ solution neutralized to a pH of 6–8 with a suitable hydroxide such as $NH_4OH$. Preferably, the solution is agitated to insure that the etched surfaces are smooth. This selective etching technique may be used to form a variety of structures including a passive optical waveguide of extremely small dimensions.

9 Claims, 3 Drawing Figures

See 3,833,435 350/96 (WG)

METHOD FOR SELECTIVELY ETCHING AL GA 09 AS MULTIPLIER STRUCTURES

BACKGROUND OF THE INVENTION

This invention relates to a method for selectively etching certain layers in an $Al_xGa_{1-x}As$ multilayer structure.

Multilayer structures employing $Al_xGa_{1-x}As$ where $x = 0 - 0.7$ have realized great significance in the field of solid state laser technology. For example, it was recently discovered that injection lasers could be fabricated which are capable of continuous operation at room temperature. The device, known as a double heterostructure laser, comprises a layer of n or p-type GaAs sandwiched between a layer of n-type AlGaAs and a layer of p-type AlGaAs with a region of n-type GaAs bounding the layer of n-type AlGaAs on the opposite surface. Light emission and electron injection in such a device are confined to the thin layer of GaAs, resulting in a sharp reduction in current density required for lasing. (See, for example, Panish and Hayashi "A New Class of Diode Lasers," Scientific American, Vol. 224, No. 1, pp. 32–40 (July 1971).) Recently a similar structure has been proposed for use as a passive waveguide (see U.S. patent application of R. A. Logan-B. Schwartz-J. C. Tracy, Jr.-W. Wiegmann Case 18-17-1-6, filed on an even date herewith). The waveguide in one embodiment is of the double heterostructure type, comprising a layer of n-type GaAs sandwiched between a layer of an n-type AlGaAs and a layer of p-type AlGaAs. The layer of n-type AlGaAs is grown on a substrate of n-type GaAs. The layers are etched photolithographically to form a mesa structure for propagation of low order modes along the guide. One of the major advantages of this structure is its adaptability to an integrated optical system which may consist, for example, of an emitter, phase modulator, waveguide and detector which are formed simultaneously.

Whether the multilayer structure is utilized as an active device or a passive waveguide, it is desirable to keep the dimensions of the GaAs region as small as possible. In the active device in forward bias operation, the small dimension allows operation at high current densities with low total current flow and therefore longer lifetimes. The reduced area also minimizes device capacitance permitting operation in higher frequency circuits. In the passive waveguide, a small area permits propagation of low order or even single order modes along the guide. Although the thickness dimension may be very small as the result of liquid phase epitaxial growth, the width dimension is not so easily controlled. Etching a mesa structure alone may not be adequate since the width dimension is limited by the definition possible through photolithographic techniques. Moreover, it is often desirable to reduce the GaAs region to dimensions which make subsequent contacting virtually impossible on a mesa structure.

It is therefore the primary object of the invention to provide a method for selectively etching one material in a structure while leaving another material essentially unaffected.

It is a further object of the invention to produce a multilayer active device or passive waveguide with the width of a GaAs layer as small as about $1\mu$ and with the ability to contact the structure if desired.

These and other objects of the invention are achieved by providing a method for differentially etching layers of GaAs or AlGaAs with small concentrations of aluminum in $Al_xGa_{1-x}As$ multilayer structures. The structure is immersed in an etchant consisting essentially of an $H_2O_2$ solution adjusted to a pH of 6–8 by a source of hydroxyl ions such as $NH_4OH$. In a preferred embodiment, the solution is agitated so as to produce smooth etched surfaces. Utilizing this process, it is possible to narrow a GaAs layer to a width of $1\mu$ while still allowing contact to the structure.

BRIEF DESCRIPTION OF THE DRAWING

These and other features of the invention will be delineated in detail in the description to follow. In the drawing.

DETAILED DESCRIPTION OF THE INVENTION

The invention is described with reference to the $Al_xGa_{1-x}As$ multilayer structure shown in FIGS. 1A–1B. It will be obvious to those skilled in the art that the process described herein may be utilized on many other $Al_xGa_{1-x}As$ multilayer structures to produce any of a variety of geometries.

Figure 1A:
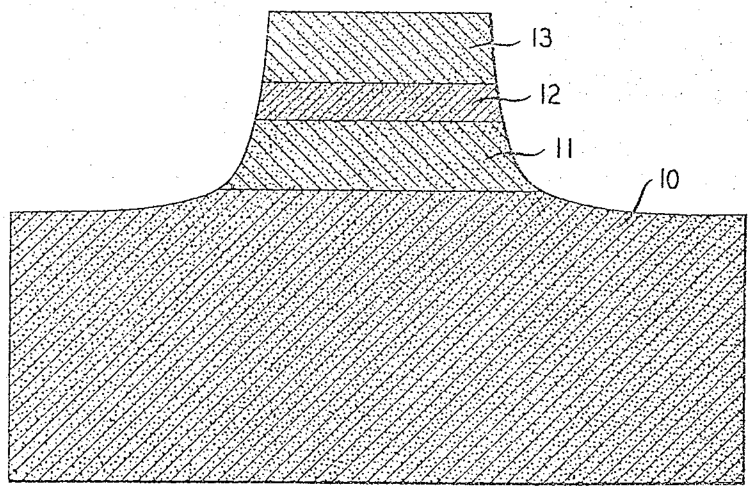
FIGS. 1A and 1B are respectively cross-sectional views of an $Al_xGa_{1-x}As$ multilayer structure before and after treatment in accordance with one embodiment of the invention.

The device shown in FIG. 1A comprises a substrate of n-type GaAs, 10, upon which is grown a layer of n-type AlGaAs, 11. Grown thereon is a layer of n-type GaAs, 12, and formed on the GaAs layer is a layer of p-type AlGaAs, 13. All three layers may be formed by standard liquid phase or molecular beam epitaxy techniques. The layers are etched to define a mesa structure as shown. Since the fabrication of this structure forms no part of the present invention, a detailed description thereof is omitted for the sake of brevity. (See U.S. patent application of R. A. Logan et al., supra.) Assuming, for example, that the GaAs layer will be used as a waveguide, the thickness of the layer is of the order of $1\mu$ and the width approximately $5\mu$. The AlGaAs layers, which will confine the radiation in the guide, will be approximately $2\mu$ in thickness.

As discussed previously, it is desirable to narrow the area of the GaAs region to a dimension which is not usually compatible with photolithographic techniques and subsequent contacting. In accordance with the invention, therefore, the layer of GaAs is selectively etched while the layers of AlGaAs are relatively unaffected.

The device was immersed in an aqueous solution of 30 percent by weight $H_2O_2$ which had been adjusted to a pH of 7 by the addition of approximately 1 ml concentrated $NH_4OH$ to 700 ml of solution. The concentration of 30 percent is convenient since this solution is commercially available. However, the concentration of $H_2O_2$ may be in the range of 10–70 percent. The adjustment of pH may also be made by other sources of hydroxyl ions. $NH_4OH$ is preferred since it contains no cation which may contaminate the GaAs material. The pH of the solution should lie within the range of 6–8 otherwise the GaAs-AlGaAs interface will not be sufficiently delineated. Etching of pure GaAs will occur at the rate of approximately $1\mu$/hour in a stagnant etch. However, if the solution is agitated in some way a rate of approximately $6\mu$/hour is realized and smoother etched surfaces are produced. Apparently, thin oxide sheets form in a stagnant etch, while agitation flushes this oxide away. Moreover, the oxide sheets that form on the surface in a stagnant etch cause the etching rate to decrease with time of etching. Agitation may be performed by a variety of means such as stirring or by rotating the device in the solution. In this example, the structure was placed near the periphery of a 2-inch diameter circular quartz disc in the solution with the longitudinal dimension of the mesas normal to a diameter. During the etch, the disc was rotated in an inclined beaker containing the etchant at approximately 60 RPM.

Figure 1B:
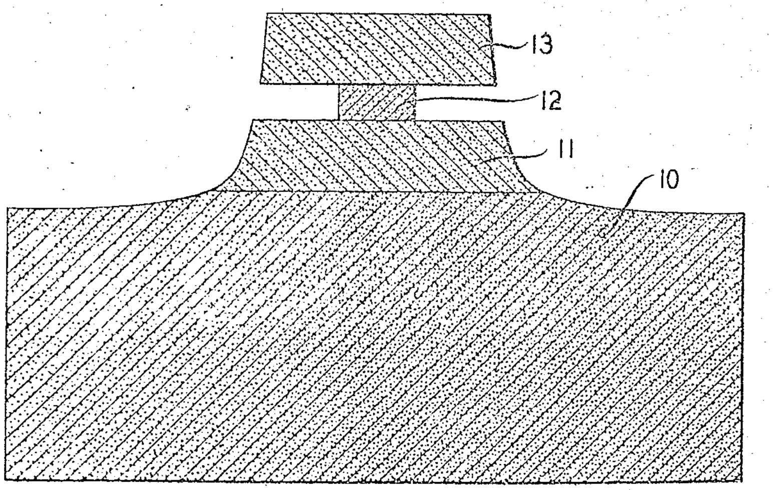

The resulting structure is shown in FIG. 1B. After about 20 minutes in the etching solution (with agitation) the region of GaAs, 12, is reduced to a width of just $1\mu$, while the adjacent layers of AlGaAs are essentially unaffected. The guide is now capable of propagating single order mode radiation. In addition, an ohmic contact can now be fabricated without the need for masking. Since the p-n junction (between layers 12 and 13) is now recessed from the edge, the metal can be evaporated over the entire surface area of the mesa without shorting the junction.

Figure 2:
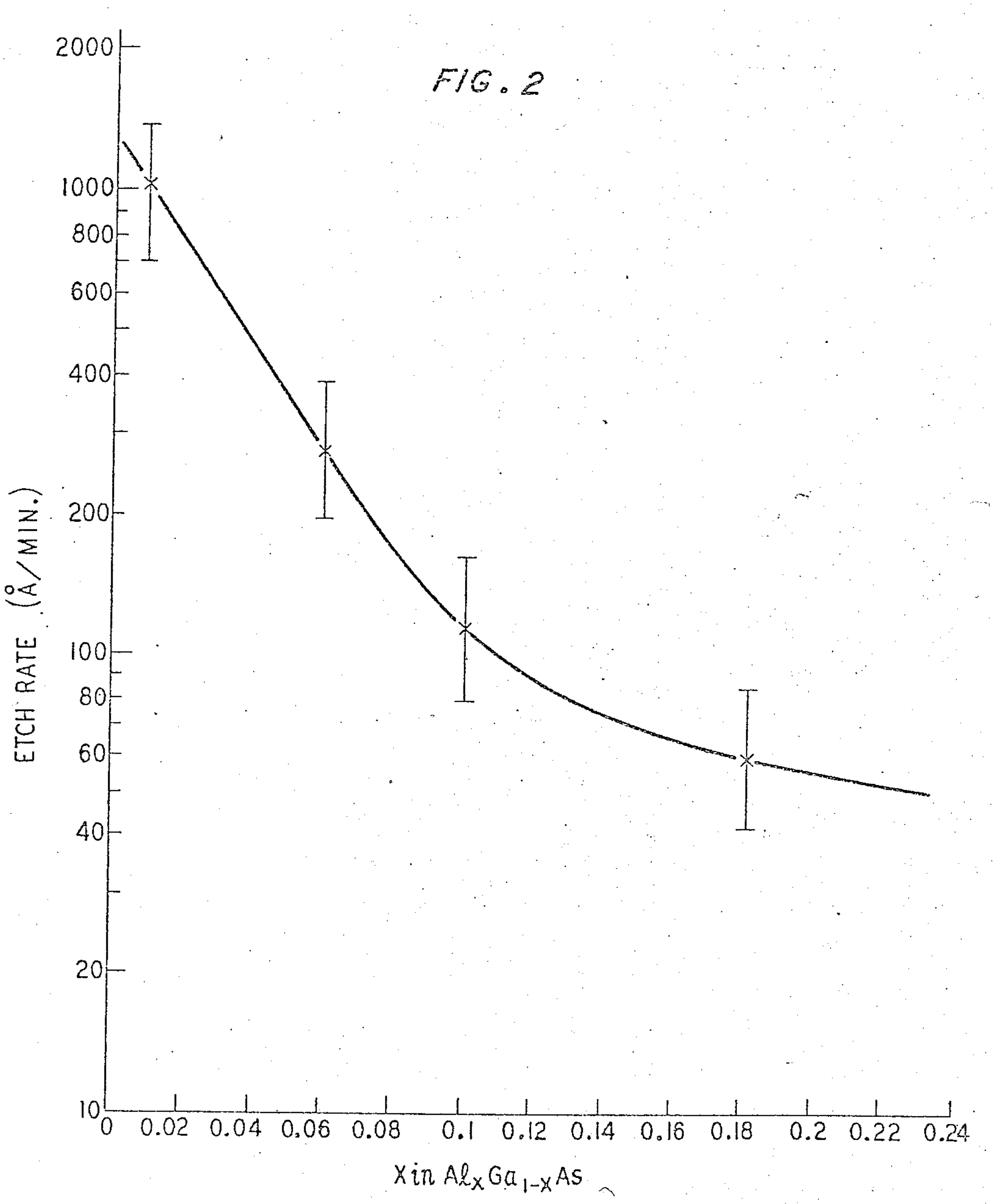
FIG. 2 is a graph of etching rate of $Al_xGa_{1-x}As$ layers as a function of aluminum concentration in accordance with one embodiment of the invention.

In the discussion of the invention to this point, only the etching of a pure GaAs region in a multilayer structure has been mentioned. However, it should be noted that often the active area of a device contains small concentrations of aluminum and the present invention is equally applicable to such structures. Of course, the rate of etching will be a function of the concentration of Al in the layer. This is illustrated in the graph of FIG. 2. Double heterostructure lasers with varying concentrations of aluminum in the p-type active regions were placed in the etching solution in accordance with the invention, without agitation, and removed after 15 minutes. The degree of etching of each region was estimated from scanning electron microscope photographs and the etching rate in A/min was plotted on a semilog scale as a function of aluminum concentration in the active region. It will be noticed immediately that the etching rate is not a linear function of Al concentration, showing a greater dependence at lower concentrations and remaining fairly constant for concentrations greater than $x = 0.25$. The maximum Al concentration desired in an active region is $x = 0.2$. Within this range, it is possible to design a host of multilayer structures wherein the Al concentration of the layer to be etched differs from the adjacent layers of higher concentration Al by an amount which will give a desired differential etching in accordance with the contemplated use of the device. For most applications, a differential etch rate of at least 10-1 is preferable, which means that the difference between the aluminum concentration of the layer to be etched and the adjacent layer must be at minimum approximately $x = 0.085$. However, in some instances a differential etch rate as low as two-to-one may be adequate and, thus, the minimum difference in aluminum concentration contemplated by this invention is approximately $\Delta x = .02$.

All etching described herein has been performed at room temperature. It should be clear, however, that heating the solution will cause an increase in the etch rate while maintaining the differential etch characteristics of the system.

Various additional modifications of the invention will become apparent to those skilled in the art. All such variations which basically rely on the teachings through which the invention has advanced the art are properly considered within the spirit and scope of the invention.

What is claimed is:

1. On a multilayer structure comprising a first layer comprising $Al_{x_1}Ga_{1-x_1}As$ adjacent to a second layer comprising $Al_{x_2}Ga_{1-x_2}As$ wherein $x_2 > x_1$, the method of selectively etching the first layer comprising the step of immersing said structure in an etching solution consisting essentially of an aqueous solution of $H_2O_2$ and a source of hydroxyl ions, said solution having a pH in the range 6–8.

2. The method according to claim 1 wherein $x_1$ lies within the range 0 – 0.2.

3. The method according to claim 1 wherein $x_2 - x_1 \geq 0.02$.

4. The method according to claim 1 wherein $x_2 - x_1 \geq 0.085$.

5. The method according to claim 1 wherein the concentration of $H_2O_2$ is within the range 10–70 percent by weight.

6. The method according to claim 1 wherein the concentration of $H_2O_2$ is 30 percent by weight.

7. The method according to claim 1 wherein the source of hydroxyl ions is $NH_4OH$.

8. The method according to claim 1 further comprising the step of agitating the solution while the device is immersed therein.

9. The method according to claim 8 wherein the solution is agitated by rotating the device while immersed is said solution.

* * * * *

UNITED STATES PATENT OFFICE
CERTIFICATE OF CORRECTION

Patent No. 3,801,391 Dated April 2, 1974

Inventor(s) John C. Dyment, Ralph A. Logan, and Bertram Schwart

It is certified that error appears in the above-identified patent and that said Letters Patent are hereby corrected as shown below:

Cover page, change title from "Method for Selectively Etching $Al_xGa_{1-x}As$ Multiplier Structures" to --Method for Selectively Etching $Al_xGa_{1-x}As$ Multilayer Structures--.

Column 1, change title from "Method for Selectively Etching AlGa 09 As Multiplier Structures" to --Method for Selectively Etching $Al_xGa_{1-x}As$ Multilayer Structures--.

Signed and sealed this 10th day of September 1974.

(SEAL)
Attest:

McCOY M. GIBSON, JR.
Attesting Officer

C. MARSHALL DANN
Commissioner of Patents=